G. C. ADAMS.
THROTTLING DEVICE FOR PIPES, OR TUBES, OR PUMPS.
APPLICATION FILED MAR. 29, 1913.
1,095,767.
Patented May 5, 1914.
3 SHEETS—SHEET 1.
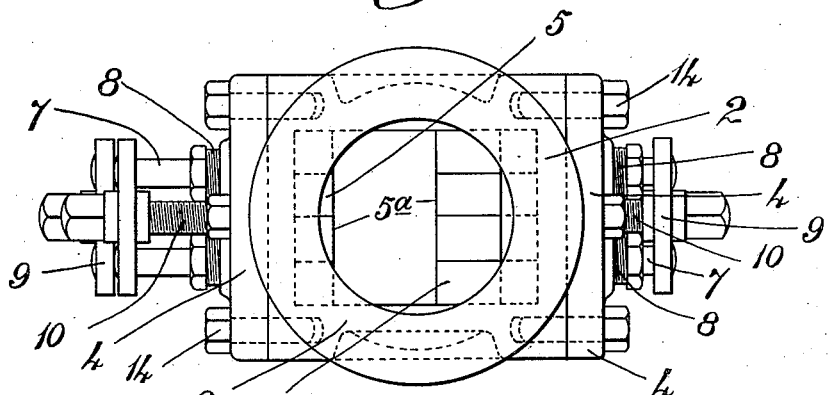
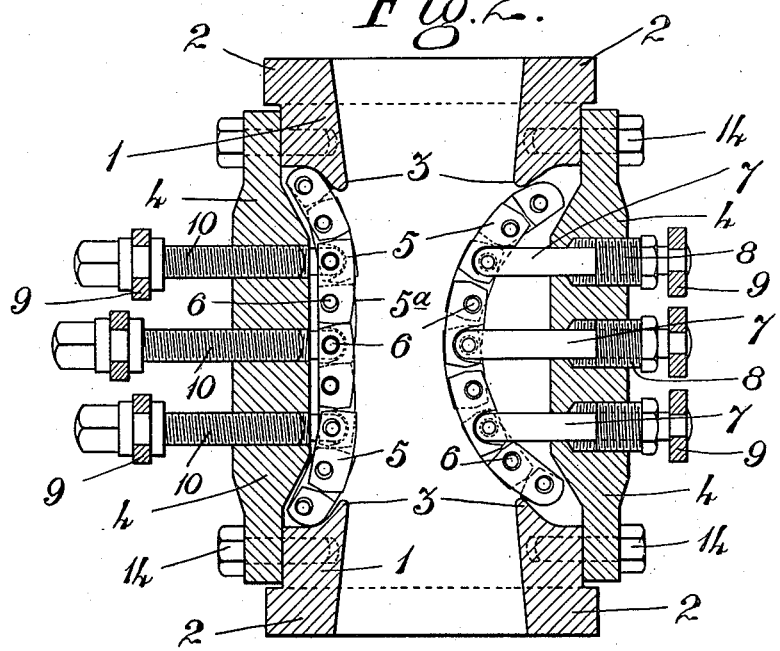
Witnesses
Inventor
George C. Adams,
by
James L. Norris,
Attorney.

G. C. ADAMS.
THROTTLING DEVICE FOR PIPES OR TUBES OR PUMPS.
APPLICATION FILED MAR. 29, 1913.
1,095,767.   Patented May 5, 1914.
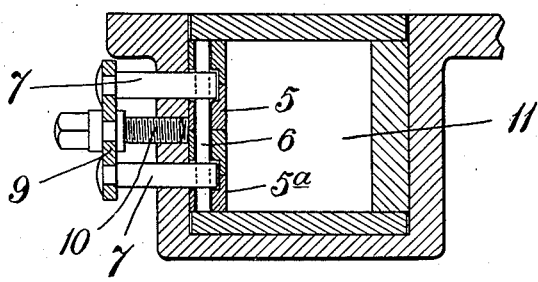
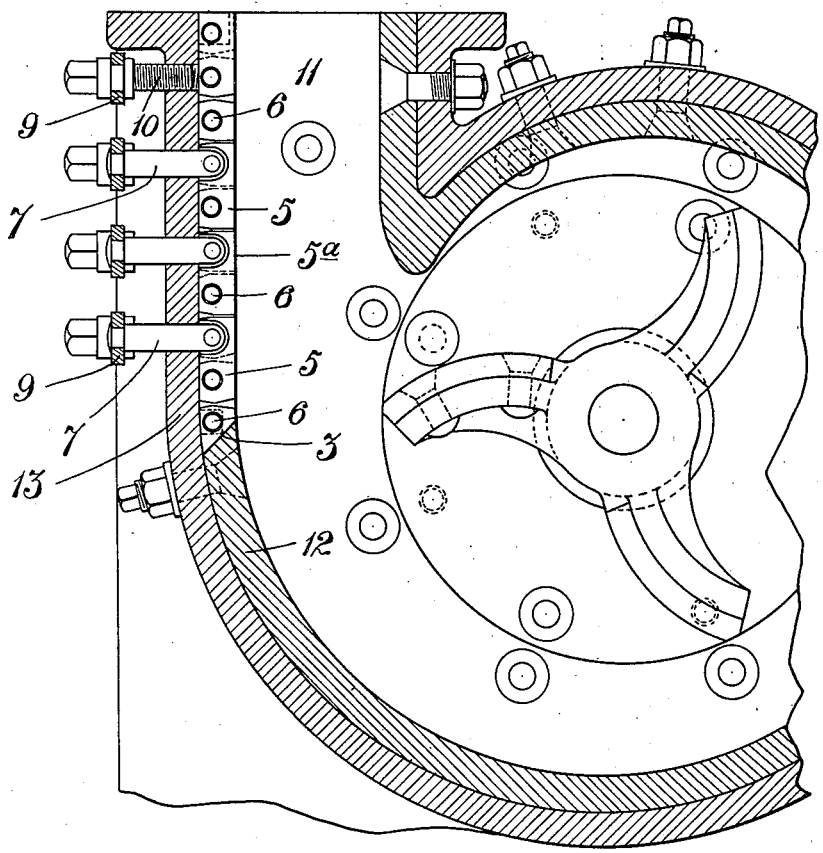
Witnesses
Inventor
George C. Adams,
by
James L. Norris, Attorney

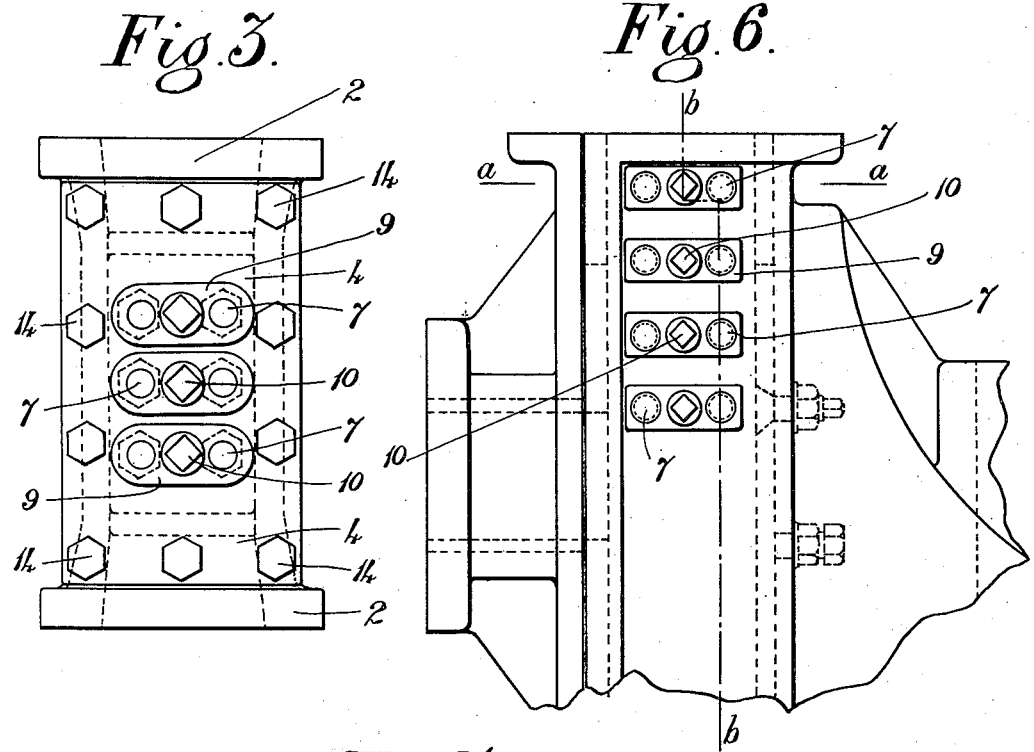
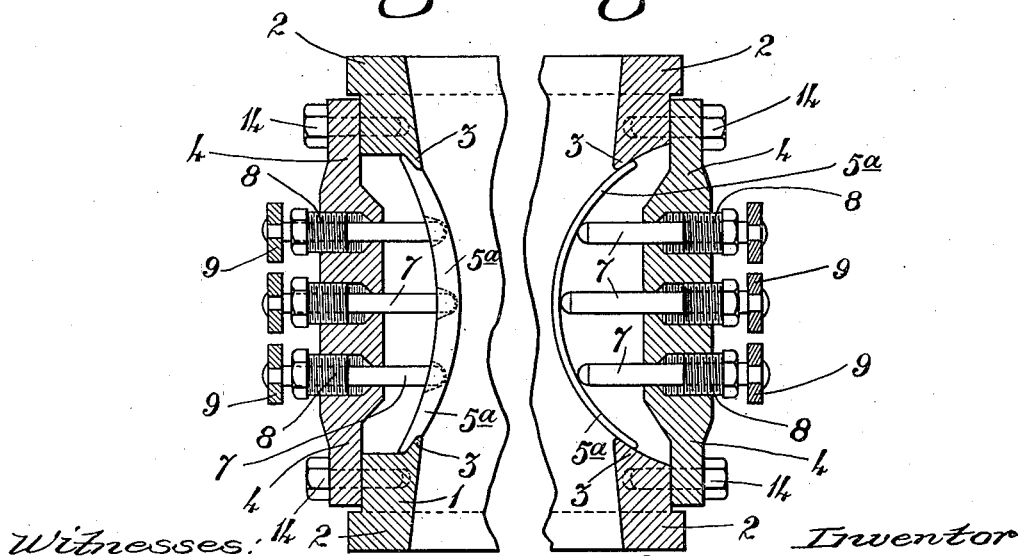

UNITED STATES PATENT OFFICE.

GEORGE COOKE ADAMS, OF CHICAGO, ILLINOIS.

THROTTLING DEVICE FOR PIPES OR TUBES OR PUMPS.

1,095,767.  Specification of Letters Patent.  Patented May 5, 1914.

Application filed March 29, 1913. Serial No. 757,606.

*To all whom it may concern:*

Be it known that I, GEORGE COOKE ADAMS, a subject of the King of Great Britain, residing at Chicago, Illinois, United States of America, have invented certain new and useful Improvements in Throttling Devices for Pipes or Tubes or Pumps, of which the following is a specification.

The object of this invention is to construct in an improved manner a throttling device or valve for pipes or tubes and for the delivery passage of pumps which is capable of being adjusted within the pipes or tubes from outside, to any curvature or angle to suit the flow of liquid, so that the stream of fluid will not be suddenly obstructed as with gate or iris diaphragm valves, thereby assisting the flow of the fluid to a material degree and without producing excessive eddies, churning or disturbance of the flow. A further object of the invention is to so construct the parts forming the improved throttling device that said parts can be readily removed for renewal or repair without it being necessary to remove the pipe or tube, or only to remove the side plate when applied to the delivery passage of a centrifugal pump.

My invention will be clearly understood from the following description aided by the annexed drawings in which:—

Figure 1 is a plan. Fig. 2 a vertical section and Fig. 3 an elevation at right angles to Fig. 2 of a portion of a pipe or tube having my invention applied on two opposite sides. Figs. 4 and 5 are horizontal and vertical sections of a pump equipped with my invention, taken, respectively, on the lines *a—a* and *b—b*, Fig. 6, and Fig. 6 is a fragmental side elevation of the said pump. Figs. 7 and 8 are fragmental detail views of modified forms of throttling devices.

For the purpose of my invention I construct my throttling device from a series of metal or other blocks or their equivalent in the form of links, which links are connected together by rods or their equivalents so as to form a strip capable of being moved about itself or bodily to any curved or angled position in the conduit to throttle same, the strip being held in such positions by screws or other suitable means, or it may be by a rigid or spring strip movable to any curved or angled position.

When applying my invention to a pipe or tube I prefer to construct a socket 1 of square or oblong shape in cross section with the throttling devices positioned on two opposite sides, the socket having round flanges 2, 2, for connection to the conduit pipes or tubes.

On the sides of the socket 1 where the throttling devices are to be positioned I form an opening, the upper and lower edges of which are each formed with a lip 3, and to each of these openings I affix a cover 4 which carries the throttling appliance and the means for positioning same.

As stated each throttling appliance consists of a number of blocks 5 placed side by side in rows with their meeting ends midway between the meeting edges of the neighboring rows, and the blocks 5 are held together by rods 6 passed through holes at the ends of each block so as to form one strip 5$^a$. Certain of the rods 6 have two stems 7 pivoted thereto, and these stems are passed through cellars or glands 8 secured to the cover 4 and are connected together in pairs by a bridge 9. In the center of this bridge is a screw 10 having a bearing in a screw threaded hole in the cover 4, so that on turning the screw 10 the stems 7 can be moved to and fro in the cover 4 to position the strip of blocks 5 to any angle or curve desired.

The strip of blocks 5 in flat condition is positioned within the opening, leaving the bore of the socket 1 full size, the ends of the strip being behind the lips 3 and the sides lying nearly flush with the walls, and these lips 3 further retain the ends of the strip of blocks 5 so that they do not project into the socket in either position in which the throttling device is placed.

In Figs. 1, 2 and 3, I have shown two throttling devices in the socket 1, but I may employ one only, in which case I require only one door. Each door is secured to the socket by bolts 14.

When applied to a pump as in Figs. 4, 5 and 6, which show a centrifugal pump of the Jennings type, I only employ one throttling device and this I position in the delivery passage 11 through a cover, as in Figs. 1 to 3, or by removing a portion of the lining 12 to leave a lip 3 at the edge and passing the stems 7 and screws 10 through holes in the wall 13, in which case, by a removal of the side plate of the pump and the rods 6, the parts can be readily disassembled.

When I employ a solid strip 5ᵃ, as in Fig. 7, or spring plate strip 5ᵃ, as in Fig. 8, as the throttling device, the strip can be actuated by the rods and screws or other devices which may be connected to lugs on the plates in the same manner as the strip of links, and the ends of the strip come under the lips 3, or, as with the strip of links, be held by other devices.

By this invention I construct a throttling appliance which will stand wear and tear when subjected to the abrading effects of gritty fluids when flowing at high velocity, and will also allow of an easy removal of worn and broken parts, and further the line of angle or curve of the throttling surface can be changed at will to suit the material being passed through the pump, and the area is gradually reduced in section and gradually expanded again to afford a free and easy transit of the fluid or liquid.

The object of applying this throttle to the centrifugal pump is to permit the discharge area to be adjusted as well as to raise or lower the position of this reduced section.

Experiments have shown that for heads up to about 20 feet, a reduction of area equal to about 25% of blade area placed a little above the lip gives best results, while for heads running above 20 feet better results are obtained by a greater percentage of reduction and a lowering of the position of the reduced area.

A still further reduction of discharge area is desirable as the effective area of the blades is reduced due to wearing away of the blades.

What I do claim as my invention and desire to secure by Letters Patent is:—

1. The combination, with a tubular, fluid-conducting element; of a throttling device arranged in the bore thereof and embodying a strip, and adjusting means therefor comprising a pair of stems having their inner ends engaged with the strip, a pair of collars through which said stems are passed, a bridge connecting the outer ends of said stems, and an adjusting screw mounted in said bridge.

2. The combination, with a tubular, fluid-conducting element; of a throttling device arranged in the bore thereof and embodying a strip, and adjusting means therefor comprising a pair of stems having their inner ends pivotally connected to the strip, a pair of collars through which said stems are passed, a bridge connecting the outer ends of said stems, and an adjusting screw mounted in said bridge.

3. In a throttling device, the combination of a strip comprising a series of pivotally-connected links; and adjusting means therefor embodying a pair of stems having their inner ends engaged with the strip, a pair of collars through which said stems are passed, a bridge connecting the outer ends of said stems, and an adjusting screw mounted in said bridge.

4. In a throttling device, the combination of a strip comprising a series of blocks arranged side by side in rows, and rods connecting said rows; and adjusting means therefor embodying a pair of stems having their inner ends engaged with the strip, a pair of collars through which said stems are passed, a bridge connecting the outer ends of said stems, and an adjusting screw mounted in said bridge.

5. The combination, with a tubular, fluid-conducting element; of a throttling device arranged in the bore thereof and embodying a strip comprising a series of blocks arranged side by side in rows, rods connecting said rows, and means connected with said rods for adjusting the position of said strip.

6. In a throttling device, the combination of a strip comprising a series of blocks arranged side by side in rows, and rods connecting said rows; and adjusting means therefor embodying a pair of stems connected at their inner ends to certain of said rods, a pair of collars through which said stems are passed, a bridge connecting the outer ends of said stems, and an adjusting screw mounted in said bridge.

In testimony whereof I have hereunto set my hand in presence of two subscribing witnesses.

GEORGE COOKE ADAMS.

Witnesses:
  HORACE NUGENT,
  HUGH CASSELLS.